UNITED STATES PATENT OFFICE.

SAMUEL LEWIS SUMMERS, OF PHILADELPHIA, PENNSYLVANIA.

CAMPHORIC-ACID ESTER OF METHYLENE DIGUAIACOL AND PROCESS OF MAKING SAME.

SPECIFICATION forming part of Letters Patent No. 707,278, dated August 19, 1902.

Application filed May 31, 1902. Serial No. 109,727. (No specimens.)

*To all whom it may concern:*

Be it known that I, SAMUEL LEWIS SUMMERS, a citizen of the United States, residing in the city of Philadelphia, State of Pennsylvania, have invented certain new and useful Camphoric-Acid Esters of Methylene Diguaiacol and Processes of Producing Same, of which the following is a full, clear, and exact description.

My invention relates to the production of a new chemical compound, and is comprehensive as well of the new product as of a preferred method for its production.

It has for its object to produce a new therapeutic agent having especial value in reduction of night-sweats common to cases of phthisis and is to be administered internally. The new chemical individual which I have discovered therefore finds its chief utility as a new pharmaceutical product. It is a crystalline product, the result of crystallizing on cooling out of hot ethyl alcohol, in which it is held in solution, and is chemically the camphoric ester of the diguaiacol derivative of methane.

The first step in the process to produce my new product is the formation of methylene-diguaiacol, or, as it may be called, "the diguaiacol derivative of $CH_4$" or methane. This is obtained by allowing formaldehyde to react on two molecules of guaiacol in the presence of a dehydrating agent, preferably phosphorus oxychlorid. The ultimate chemical reaction sought, however, is the formation of an ester by the reaction of an organic acid on the compound phenol. Being allowed to act on camphoric acid, the aforesaid combining reaction supervenes, a crystalline resultant is formed, which is to be isolated from its mother-liquor, dissolved in hot alcohol, and it is then crystallized out on cooling. The initial formation of the diguaiacol derivative of methane, however, is not essential, as it may be done simultaneously with, or, rather, as the first reaction preceding an immediately-successive reaction thereon of the camphoric acid, and I prefer to so carry through the process in practically one operation. To that end I take two hundred parts, by weight, of camphoric acid, two hundred and forty-eight parts, by weight, of guaiacol, adding one hundred and fifty parts of the phosphorus oxychlorid dissolved in a suitable solvent, such as xylene, and heat the solution to about 100° centigrade. Then of an aqueous solution of thirty to forty parts of pure formaldehyde gas I take about three hundred parts, by weight, and heating it pass the formaldehyde as a gas into the first-named solution. As soon as this is completed the combined product, which is the acid ester sought for, is allowed to cool, is then separated from the mother-liquor, (which is the resultant side product from the original materials used,) and is passed into a hot solution of ethyl alcohol, which dissolves the ester, and on cooling it crystallizes out. These crystals are white lustrous scales, tasteless, melting at 130° centigrade, having the empirical formula $C_{27}H_{28}O_6$, are insoluble in dilute alkaline solution, and soluble in ether, benzene, and hot ethyl alcohol.

In further description of the reaction recited it may aid to a better or more perfect understanding of it by a recital of reaction, showing the structural formula of the new product:

$CH_2O + 2C_6H_4(OCH_3)(OH) + C_{10}H_{14}(COOH)_2 =$

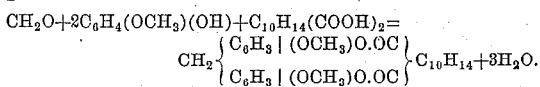

Having thus described my invention, what I claim as new, and desire to secure by Letters Patent, is—

1. The new product described, which is the crystalline camphoric-acid ester of methylene diguaiacol, a stable compound of camphoric acid chemically united with the diguaiacol derivative of methane; crystallizing in white lustrous scales, tasteless, having the empirical formula $C_{27}H_{28}O_6$, melting at about 130° centigrade, insoluble in dilute alkaline solution, and soluble in ether, benzene and hot ethyl alcohol.

2. The process described, of producing the camphoric-acid ester of methylene diguaiacol, which consists in passing formaldehyde gas through an admixed heated solution of camphoric acid, guaiacol, and phosphorus oxychlorid preliminarily dissolved in a suitable solvent; and then isolating it from the mother-liquor and crystallizing it; substantially as described.

In testimony whereof I have hereunto affixed my signature this 28th day of May, A. D. 1902.

SAMUEL LEWIS SUMMERS.

Witnesses:
H. R. HAGEN,
BERTHA F. TAPPAN.